United States Patent Office
3,847,894
Patented Nov. 12, 1974

3,847,894
ARYL-AZO-PYRIDONE COMPOUNDS CONTAINING A SUBSTITUTED PYRIMIDINE OR TRIAZINE GROUP
Denis Robert Annesley Ridyard, Manchester, England, assignor to Imperial Chemical Industries Limited, London, England
No Drawing. Filed Apr. 25, 1972, Ser. No. 247,321
Claims priority, application Great Britain, Apr. 29, 1971, 12,121/71
Int. Cl. C09b 29/36
U.S. Cl. 260—153          3 Claims

ABSTRACT OF THE DISCLOSURE

A water-soluble azo dyestuff having the general formula:

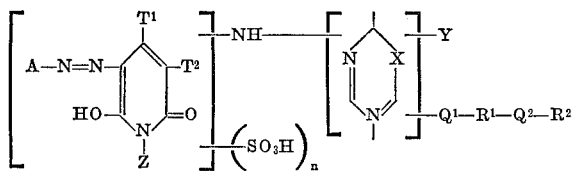

wherein A represents the residue of a diazo component of the benzene or naphthalene series, Z represents a hydrogen atom or an optionally substituted alkyl, aralkyl, cycloalkyl, aryl or heterocyclic radical, $T^1$ represents a hydrogen atom, an optionally substituted alkyl, aralkyl, cycloalkyl, aryl or heterocyclic radical or a hydroxyl, cyano, —$COR^3$, —$CCOR^3$ or —$CONR^3R^4$ group in which $R^3$ and $R^4$ each independently represents a hydrogen atom or an optionally substituted alkyl, aralkyl, cycloalkyl, aryl or heterocyclic radical or the group —$NR^3R^4$ represents the radical of 5 or 6 membered heterocyclic ring, $T^2$ represents a hydrogen atom, an optionally substituted alkyl, aralkyl, cycloalkyl, aryl or heterocyclic radical or a cyano, —$COR^3$, —$COOR^3$ or —$CONR^3R^4$ group in which $R^3$ and $R^4$ have the meanings already stated, X represents =N—, =C—Cl or =C—CN, Y represent chlorine or bromine, $Q^1$ represents oxygen, sulphur or —NR— wherein R represents hydrogen or lower alkyl, $Q^2$ represents oxygen, sulphur or a direct link, $R^2$ represents an optionally substituted alkyl radical having from 2 to 18 carbon atoms or a cycloalkyl, aralkyl or aryl radical, $R^1$ represents a divalent hydrocarbon radical such that $R^1$ and $R^2$ together contain at least 8 carbon atoms and n represents a positive integer, the dyestuff being free from nitro groups.

This azo dyestuff, containing fiber-reactive groups, are valuable for coloring polyamide textile materials and have excellent fastness to wet treatments and to light.

---

This invention relates to azo dyestuffs and more particularly it relates to water-soluble azo dyestuffs containing fibre-reactive groups which are particularly valuable for coloring polyamide textile materials.

Heretofore, there have been known water-soluble compounds containing at least one sulphonic acid group, at least one cellulose-reactive group and at least one group of the formula:

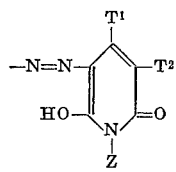

wherein Z represents a hydrogen atom or an alkyl, aralkyl, cycloalkyl, aryl or heterocyclic radical which may be substituted.

$T^1$ represents a hydrogen atom, a CN, $COOR^1$, $CONR^1R^2$, $COR^1$ or CH group or an alkyl, aralkyl, cycloalkyl, aryl or heterocyclic radical which may be substituted, and $R^1$ and $R^2$ each independently represents a hydrogen atom, an alkyl, aralkyl, cycloalkyl, aryl or heterocyclic radical which may be substituted or the group —$NR^1R^2$ represents the radical of 5 or 6 membered heterocyclic ring compound,
$T^2$ represents a hydrogen atom, a CN, $COOR^1$, $CONR^1R^2$,
or $COR^1$ group or an alkyl, aralkyl, cycloalkyl, aryl or heterocyclic radical which may be substituted, and M represents a hydrogen atom or a metal atom forming part of a metal-complex system in the dyestuff.

The present invention provides water-soluble azo dyestuffs having the general formula:

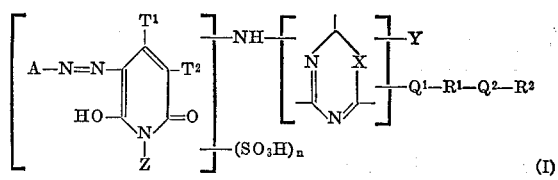

(I)

wherein A represents the residue of a diazo component of the benzene or naphthalene series, Z represents a hydrogen atom or an optionally substituted alkyl, aralkyl, cycloalkyl, aryl or heterocyclic radical, $T^1$ represents a hydrogen atom, an optionally substituted alkyl, aralkyl, cycloalkyl, aryl or heterocyclic radical or a hydroxyl, cyano, —$COR^3$, —$COOR^3$ or —$CONR^3R^4$ group in which $R^3$ and $R^4$ each independently represents a hydrogen atom or an optionally substituted alkyl, aralkyl, cycloalkyl, aryl or heterocyclic radical or the group —$NR^3R^4$ represents the radical of a 5 or 6 membersd heterocyclic ring, $T^2$ represents a hydrogen atom, an optionally substituted alkyl, aralkyl, cycloalkyl, aryl or heterocyclic radical or a cyano, —$COR^3$, —$COOR^3$ or $CONR^3R^4$ group in which $R^3$ and $R^4$ have the meanings already stated, X represents =N—,

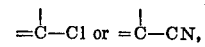

Y represents chlorine or bromine, $Q^1$ represents oxygen, sulphur or —NR— wherein R represents hydrogen or lower alkyl, $Q^2$ represents oxygen, sulphur or a direct link, $R^2$ represents an optionally substituted alkyl radical having from 2 to 18 carbon atoms or a cycloalkyl, aralkyl or aryl radical, $R^1$ represents a divalent hydrocarbon radical such that $R^1$ and $R^2$ together contain at least 8 carbon atoms, and n represents a positive integer, the dyestuffs being free from nitro groups.

The radical represented by A may carry the usual substituents appropriate to diazo components. Examples of such substituents include sulphonic acid and carboxylic acid groups, chlorine, bromine, cyano, lower alkyl, lower alkoxy, trifluoromethyl, —$NHCOR^5$ where $R^5$ is an alkyl, aryl, alkoxy, aryloxy, alkylamino, arylamino or amino radical, —$SO_2NR^6R^7$ where $R^6$ is alkyl or aryl and $R^7$ is hydrogen or alkyl and —$SO_2R^8$ where $R^8$ is alkyl or aryl. Other substituents which may be carried by A include phenylazo and naphthylazo radicals which may themselves be substituted.

The optionally substituted alkyl radicals represented by $T^1$, $T^2$, $R^3$, $R^4$ and Z are preferably optionally substituted lower alkyl radicals, and as specific examples of such radicals there may be mentioned methyl, ethyl, n-propyl and n-butyl, hydroxy lower alkyl such as β-hydroxyethyl, lower alkoxy lower alkyl such as β-(methoxy or ethoxy) ethyl, cyanomethyl, carbamoylmethyl, carbethoxymethyl and acetylmethyl.

Throughout the Specification the terms "lower alkyl" and "lower alkoxy" are used to denote alkyl and alkoxy radicals respectively containing from 1 to 4 carbon atoms.

Divalent hydrocarbon radicals which may be represented by $R^1$ include arylene radicals optionally carrying one or more halogen, alkyl or alkoxy substituents, alkylene radicals and cycloalkylene radicals.

When $R^2$ represents an alkyl radical, it may be branched or straight chain; preferably it contains from 4 to 12 carbon atoms.

As examples of aralkyl radicals represented by $T^1$, $T^2$, $R^2$, $R^3$, $R^4$ and Z there may be mentioned benzyl and β-phenylethyl. As an example of cycloalkyl radicals represented by $T^1$, $T^2$, $R^2$, $R^3$, $R^4$ and Z, there may be mentioned cyclohexyl. The optionally substituted aryl radicals represented by $T^1$, $T^2$, $R^2$, $R^3$, $R^4$ and Z are preferably optionally substituted phenyl radicals and as specific examples of such radicals there may be mentioned phenyl, tolyl, chlorophenyl, carboxyphenyl, methoxyphenyl and sulphophenyl. The optionally substituted heterocyclic radicals representsd by $T^1$, $T^2$, $R^3$, $R^4$ and Z are preferably optionally substituted 5- and 6-membered heterocyclic rings, and as specific examples of such radicals there may be mentioned 2-pyridyl, 2-thiazolyl, 1-piperidinyl and 1-morpholinyl.

As examples of 5 and 6 membered heterocyclic rings which may be represented by —$NR^3R^4$ there may be mentioned piperidine, morpholine, piperazine and pyrrolidine.

Within the general class of dyestuffs represented by Formula I, particular mention may be made of those dyestuffs in which $Q^1$ is oxygen or sulphur and $R^1$ is an arylene radical optionally carrying one or more halogen, alkyl or alkoxy substituents.

The positive integer represented by $n$ is preferably 1 or 2.

Some of the dyestuffs of the invention can exist in a number of tautomeric forms; for convenience the dyestuffs have been formulated in only one of these forms but it is to be understood that this Specification relates to dyestuffs in any of the possible tautomeric forms.

A preferred class of monoazo dyestuffs of the invention comprises the dyestuffs which in one of the possible tautomeric forms are represented by the formula: II

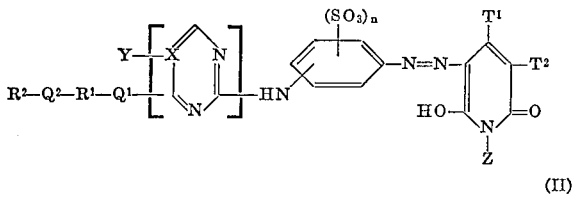

(II)

wherein $T^1$, $T^2$, $R^1$, $R^2$, $Q^1$, $Q^2$, X, Y and $n$ have the meanmeanings already stated and the fibre-reactive group is attached to the benzene ring in meta or para position to the azo group.

A further preferred class of monoazo dyestuffs of the invention may be represented by the formula: III

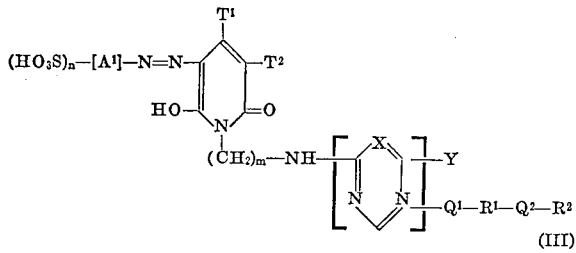

(III)

wherein $T^1$, $T^2$, $R^1$, $R^2$, $Q^1$, $Q^2$, X, Y and $n$ have the meanings already stated. Preferably $m$ is between 2 and 6. The radical A is a naphthalene or benzene nucleus, which in addition to at least one sulphonic acid group may optionally carry other substituents such as chlorine, bromine, lower alkyl such as methyl, lower alkoxy such as methoxy, cyano and acetyl amino.

The dyes of Formula I may be prepared by reacting a compound of the formula:

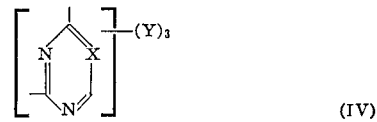

(IV)

wherein X and Y have the meanings already stated, with, in either order, an azo compound of the formula:

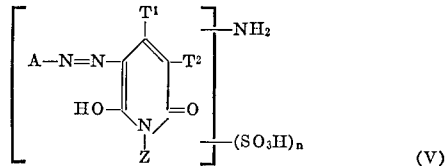

(V)

wherein A, $T^1$, $T^2$, Z and $n$ have the meanings already stated and a compound of the formula:

$$R^2—Q^2—R^1—Q^1—H \qquad (VI)$$

wherein $R^1$, $R^2$, $Q^1$ and $Q^2$ have the meanings already stated.

The dyestuffs of Formula I may also be prepared by diazotizing an aromatic amine of the benzene or naphthalene series and coupling the diazo compound so obtained with a coupling component of the formula:

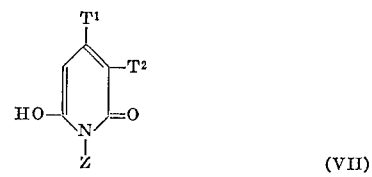

(VII)

wherein $T^1$, $T^2$ and Z have the meanings already stated, the amine and the coupling component together containing at least one sulphonic acid group and a group of the formula:

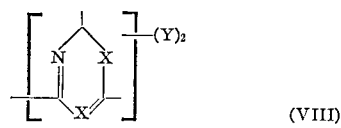

(VIII)

wherein X and Y have the meanings already stated, and then reacting the product with a compound of Formula VI.

Suitable compounds of Formula IV are cyanuric chloride, cyanuric bromide, 2,4,6-trichloropyrimidine, 2,4,6-tribromopyrimidine, 2,4,5,6 - tetrachloropyrimidine and 2,4,6-trichloro-5-cyanopyrimidine.

Aromatic amines which contain a fibre reactive group of formula VIII can be obtained by condensing a compound of formula IV with the appropriate diamine under such conditions that only one of the two amino groups reacts with the compound of formula VIII. As specific examples of such diamines there may be mentioned 1,3-phenylenediamine - 4 - sulphonic acid, 1,4-phenylenediamine - 2 - sulphonic acid, 1,3-phenylenediamine-4,6-disulphonic acid, 1,4 - phenylenediamine - 2,5 - disulphonic acid and 2,6-diaminonaphthalene-4,8-disulphonic acid.

Coupling components of formula VII which contain a fibre reactive group of formula VIII can be obtained by condensing the appropriate coupling component containing an amino group with a compound of formula IV.

As specific examples of aromatic amines free from fibre-reactive groups which can be coupled with coupling components of formula VII which contain a fibre reactive group of formula VIII there may be mentioned aniline 2-, 3- and 4-sulphonic acids, aniline -2,5-, 2,4- and 3,5-disulphonic acids, 2-aminophenol -4 or 6-sulphonic acid, 4- or 5-sulpho -2-aminobenzoic acid, 4-(or 6-)chloro-2- aminophenol -6- (or 4-)sulphonic acid, 2-aminophenol-4,6-disulphonic acid, 4-(acetylamino or methyl or methoxy)

aniline -2-sulphonic acid, 1-naphthylamine -3-, 4-, 5-, 6-, 7- and 8- sulphonic acid, 2-amino naphthalene -1-, 5-, 6-, 7- or 8-sulphonic acid, 1-naphthylamine, 2,7-, 3,6-, 3,8-, 4,6- and 4,7- disulphonic acid, 2-naphthylamine, 1,5-, 3,7-, 4,8-, 5,7- and 6,8-disulphonic acid 1-naphthylamine -36,8- 4,8-, 5,7- and 6,8-disulphonic acid 1-naphthylamine -3,6,8- and 2,5,7 - trisulphonic acid and 2 - naphthylamine - 3,6,8- tri-sulphonic acid.

Azo compounds of Formula V may be obtained by diazotizing an aromatic amine and coupling the diazo compound so obtained with a coupling component of the formula:

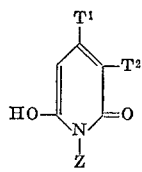

Suitable compounds of Formula VI include alkylphenols, for example o-, m-, and p-ethylphenols, o-, m-, and p-butylphenols, amylphenols, hexylphenols, p-octylphenol, p-nonylphenol, p-dodecylphenol, m-pentadecylphenol, p-hexadecylphenol, and p-octadecylphenol; cycloalkylphenols, for example o- and p-cyclohexylphenols; aralkylphenols, for example o-, m- and p-benzylphenols; arylphenols, for example o-, m-, and p-phenylphenols; alkoxyphenols, for example hydroquinone and resorcinol monoalkyl ethers where the alkyl residue may be ethyl, propyl, butyl, amyl, hexyl, heptyl, octyl, nonyl, decyl, and dodecyl; cycloalkoxyphenols, for example p-cyclohexyloxyphenol, aralkoxyphenols, for example p-benzyloxyphenol; aryloxyphenols, for example p-phenoxyphenol; thio-substituted phenols, for example o-, m-, and p-(butylthio)phenols, o- and m-(hexylthio)phenols, o-(heptylthio)phenol, p-(dodecylthio)phenol, o- and p-(benzylthio)phenols, o-, m-, and p-(phenylthio)phenols; benzenethiols, for example p-butylbenzenethiol, p-butoxybenzenethiol, p-(butylthio)benzenethiol, p-amylbenzenethiol, p-hexylbenzenethiol, p-hexyloxybenzenethiol, p-octylbenzenethiol, p-nonylbenzenethiol, p-decylbenzenethiol, p-dodecylbenzenethiol, p-biphenylenethiol, and m-(phenylthio)benzenethiol. Suitable compounds of Formula VI wherein $R^1$ may carry one or more halogen, alkyl, or alkoxy substituents in addition to the —$Q^2$ —$R^2$ residue include 4-n-butyl-2-methylphenol,
4-*sec*-butyl-2-methylphenol,
3-*iso*-butyl-5-methylphenol,
4-n-butyl-2-methoxyphenol,
4-n-butyl-2-chlorophenol,
4-chloro-2-ethylphenol,
2,4- and 2,6-dipropylphenols,
2,4- and 2,6-di-*tert*-butylphenols,
2,6-di-*tert*-butyl-4-ethylphenol,
2,6-di-*tert*-butyl-4-chlorophenol,
2,6-di-*tert*-butyl-4-methoxyphenol,
4-*tert*-butyl-2,6-dimethylphenol,
4-*tert*-butyl-2,5-dimethylphenol,
4-*tert*-butyl-2,5-dimethylphenol,
4-*tert*-amyl-2-methoxyphenol,
2-chloro-4-octylphenol.

Suitable compounds of formula VI also include alkylamines, for example octylamine and dodecylamine, substituted alkylamines for example benzylisopropylamine and benzyl*sec* butylamine, substituted cyclohexylamines, for example 2-benzylcyclohexylamine and 4-butylcyclohexylamine and alkylanilines for example 4-butylaniline, 4-octyl aniline and 4-dodecylaniline.

The reactions leading to the formation of dyes of Formula I may be carried out using conditions that have been fully described in the prior art for such reactions.

The dyes of the present invention, optionally in the form of their water-soluble salts, particularly sodium salts, may be used for coloring cellulosic textile materials using methods that have been fully described in the prior art for the application of monohalogenotriazinyl and halogenopyrimidinyl dyes. They are particularly useful, however, for coloring textile materials based on natural or synthetic nitrogenous fibres.

The dyes are especially suitable for dyeing wool including wool which has been rendered non-felting or machine-washable by chemical processes such as acid chlorination, the use of hypochlorite under neutral or slightly alkaline conditions, the use of permonosulphuric acid, the use of the sodium salt of dichloroisocyanuric acid, and by the deposition of polymers on the surface of the wool using for example amine-epichlorohydrin resins. Material which has been so treated may be dyed by conventional wool dyeing methods, by the use of pad-batch dyeing methods, and also by continuous pad-steam processes. When applied to such fibres, the dyes have excellent fastness to wet treatments and to light.

The invention is illustrated but not limited by the following Examples in which all parts are by weight.

Example 1

A solution of 6.7 parts of 1,3-phenylenediamine-4,6-disulphonic acid in 100 parts of water at 0–5° C. and pH 5.0 is added rapidly to a suspension prepared by dissolving 4.62 parts of cyanuric chloride in 15 parts of acetone and adding the resulting solution to 30 parts of water and 30 parts of ice. The mixture is stirred for 2 hours at 0–5° C. maintaining the pH at 4–5 by addition of 2N sodium carbonate solution as required. 7.5 parts of 36° Tw hydrochloric acid are then added and the mixture diazotized by the addition of 1.7 parts of sodium nitrite in 11.5 parts of water. The diazo suspension is then added to a solution of 4.9 parts of 1-ethyl-3-aminocarbonyl-4-methyl-6-hydroxypyrid-2-one in 100 parts of water at 0–5° C. and pH 7.0. The mixture is stirred at 0–5° C. for 2 hours maintaining the pH at 7.0 by addition of 2N sodium carbonate solution, and is finally stirred for 16 hours gradually warming to 20° C. The reaction mixture is then added slowly during 30 minutes to a stirred solution of 4.2 parts of p-tert-butyl phenol in a mixture of 50 parts of acetone and 100 parts of water at 30° C., which has been adjusted to a pH between 8.5 and 9.0 by the addition of 2N sodium hydroxide solution. The pH of the reaction mixture is maintained between 8.5 and 9.0 during the addition. The reaction mixture is stirred under these conditions during a further 3 hours and the pH is then adjusted to between 6.5 and 7.0. Sodium chloride (10% weight/volume) is then added and the precipitated dyestuff is filtered off, washed with 10% brine solution and dried at 40° C.

When applied to wool from a weakly acid dyebath the dyestuff yields a bright greenish yellow shade having excellent fastness to wet treatments and to light.

Example 2

If the 4.2 parts of p-tert-butylphenol in the above example is replaced by 4.2 parts of 4-butylaniline and the reaction is carried out at pH 5–6, a dyestuff is obtained, which when applied to wool from a weakly acid dyebath yields a bright greenish yellow shade having excellent fastness to wet treatments and to light.

The following Table gives further examples of the invention obtained in a similar manner to Examples 1 and 2 by condensing the diamine named in the second column with one mole of the acid chloride compound named in the first column and diazotizing and coupling the resultant amino compound with the coupling component named in the third column followed by condensation with the phenol, amine or thiol named in the fourth column. The shade of the dyestuff when applied to wool or nylon is given in the final column.

| Example | I | II | III | IV | Shade |
|---|---|---|---|---|---|
| 3 | Cyanuric chloride | 1,3-phenylene diamine 4,6-disulphonic acid | 1-ethyl-3-aminocarbonyl-4-methyl-6-hydroxypyrid-2-one | 4-nonylphenol | Greenish-yellow. |
| 4 | do | do | do | 4-dodecylphenol | Do. |
| 5 | do | do | 1-methyl-3-aminocarbonyl-4-methyl-6-hydroxypyrid-2-one | 4-nonylphenol | Do. |
| 6 | do | do | do | 3-pentadecylphenol | Do. |
| 7 | do | do | do | 4-cyclohexylphenol | Do. |
| 8 | do | 1,4-phenylenediamine-2,5-disulphonic acid | 1-ethyl-3-aminocarbonyl-4-methyl-6-hydroxypryid-2-one | 4-nonylphenol | Reddish-yellow. |
| 9 | do | do | do | 4-benzylphenol | Do. |
| 10 | do | do | do | 4-phenoxy phenol | Do. |
| 11 | do | do | do | 4-n-butyl-2-methylphenol | Do. |
| 12 | do | do | 1-methyl-3-aminocarbonyl-4-methyl-6-hydroxypyrid-2-one | 4-dodecylphenol | Do. |
| 13 | do | 1,3-phenylenediamine-4,6-disulphonic acid | 1-ethyl-4-methyl-6-hydroxypyrid-2-one | 4-nonpylphenol | Do. |
| 14 | do | do | do | 4-dodecylphenol | Do. |
| 15 | do | do | 1-ethyl-4-methyl-3-cyano-6-hydroxypyrid-2-one | 4-nonylphenol | Do. |
| 16 | do | do | 1-ethyl-3,4-dimethyl-6-hydroxypyrid-2-one | 4-tert.-butylphenol | Do. |
| 17 | do | do | 1-ethyl-4-methyl-3-ethyl-6-hydroxypyrid-2-one | 4-nonylphenol | Do. |
| 18 | do | do | 1-ethyl-4-methyl-3-butyl-6-hydroxypyrid-2-one | 4-tert.butylphenol | Do. |
| 19 | do | do | 2,6-dihydroxy-3-cyano-4-methylpyridine | 4-nonylphenol | Do. |
| 20 | do | do | 1-β-hydroxyethyl-3-cyano-4-methyl-6-hydroxypyrid-2-one | do | Do. |
| 21 | do | do | 2,6-dihydroxypyridine | do | Do. |
| 22 | do | do | 2,6-dihydroxy-4-methylpyridine | do | Do. |
| 23 | do | do | 2,6-dihydroxy-3,4-dimethyl pyridine | do | Do. |
| 24 | do | 1,4-diaminobenzene-2,5-disulphonic acid | 1-ethyl-4-methyl-6-hydroxypyrid-2-one | 4-nonylphenol | Reddish-yellow. |
| 25 | do | do | 1-ethyl-4-methyl-3-cyano-6-hydroxypryid-2-one | 4-octylphenol | Do. |
| 26 | do | do | 2,6-dihydroxypyridine | 4-dodecylphenol | Do. |
| 27 | do | do | 2,6-dihydroxy-4-methylpyridine | 4-tert.butylphenol | Do. |
| 28 | do | do | 1-cyclohexyl-3-cyano-4-methyl-6-hydroxypyrid-2-one | 4-ethylphenol | Do. |
| 29 | do | do | 2,4,6-trihydroxypyridine | 4-nonylphenol | Do. |
| 30 | do | 2,6-diaminonaphthalene-4,8-disulphonic acid | 1-ethyl-3-aminocarbonyl-4-methyl-6-hydroxypyrid-2-one | 4-tert.butylphenol | Orange. |
| 31 | do | 1,3-phenylenediamine-4,6-disulphonic acid | do | 4-hexylbenzenethiol | Greenish-yellow. |
| 32 | do | do | 1-ethyl-4-methyl-3-ethyl-6-hydroxypyrid-2-one | 4-nonylbenzenethiol | Do. |
| 33 | do | do | 1-ethyl-4-methyl-6-hydroxypyrid-2-one | 4-phenylphenol | Do. |
| 34 | do | do | do | 2-phenylphenol | Do. |
| 35 | do | do | do | 4-amylphenol | Do. |
| 36 | do | do | 1-ethyl-3-aminocarbonyl-4-methyl-6-hydroxypyrid-2-one | 4-octylphenol | Do. |
| 37 | do | do | do | Octylamine | Do. |
| 38 | do | do | do | 4-butylcyclohexylamine | Do. |
| 39 | do | do | do | 2-benzylcyclohexylamine | Do. |
| 40 | do | do | do | 4-dodecylaniline | Do. |
| 41 | 2,4,6-trichloropyridine | do | do | 4-butylaniline | Do. |
| 42 | 2,4,5,6-tetrachloropyrimidine | do | do | do | Do. |
| 43 | 2,4,6-trichloro-5-cyano-pyrimidine | do | do | do | Do. |
| 44 | Cyanuric chloride | do | do | 2-phenylethylamine | Do. |
| 45 | do | do | do | 2-phenoxyethylamine | Do. |
| 46 | do | do | do | 4-aminodiphenyl | Do. |

Example 47

A suspension of 10.55 parts of N-β-aminoethyl-3-aminocarbonyl-4-methyl - 6 - hydroxypyrid-2-one in 100 parts of water is stirred at 40° C. and dissolved by addition of 2N sodium carbonate solution until solution is just complete. The pH of the solution is then adjusted to 7.5 with 2N hydrochloric acid and the solution is added during 15 minutes at pH 6.5 and 0–5° C. to a suspension prepared by adding a solution of 10 parts of cyanuric chloride in 30 parts of acetone to a mixture of 75 parts of ice and 75 parts of water. The mixture is stirred at 0–5° C. for a further 2 hours maintaining the pH at 6–7 by the addition of 2N sodium carbonate solution as required.

A solution of 12.7 parts of aniline-2,5-disulphonic acid in 150 parts of water and 10 parts of 36° Tw hydrochloric acid is diazotized at 0–5° C. by the addition of 2N sodium nitrite solution until a faint excess of nitrous acid persists. The excess of nitrous acid is removed by addition of a 10% aqueous solution of sulphamic acid and the solution is added to the coupling solution prepared as described in paragraph one above. The mixture is stirred at 10° C. for 3 hours, keeping the pH at 6 by the addition of 2N sodium carbonate solution as required. The reaction mixture is then added during 30 minutes to a stirred solution of 13.2 parts of 4-nonyl phenol in 100 parts of acetone at 30° C. The pH of the reaction mixture is maintained between 8.5 and 9.0 during the addition. The reaction mixture is stirred under these conditions during a further 3 hours and the pH is then adjusted to between 6.5 and 7.0. Sodium chloride (10% weight/volume) is then added and the precipitated dyestuff is filtered off, washed with 10% brine solution and dried at 40° C.

When applied to wool from a weakly acid dyebath the dyestuff yields a bright greenish yellow shade having excellent fastness to wet treatments and to light.

The following Table describes further examples of the invention obtained in a similar manner by condensing the pyridone or pyridine compound named in Column I with cyanuric chloride, coupling the resultant product with the diazonium salt of the amine named in Column II and finally reacting with the phenol or amine named in Column III. The shade of the dyestuff when applied to wool or nylon is given in the final column.

| Example | I | II | III | Shade |
|---|---|---|---|---|
| 48 | 1-β-aminoethyl-3-aminocarbonyl-4-methyl-6-hydroxypyrid-2-one. | Aniline-2,5-disulphonic acid | 4-dodecylaniline | Greenish-yellow. |
| 49 | do | 2-naphthylamine-1,5-disulphonic acid | 4-nonylphenol | Yellow. |
| 50 | do | 2-naphthylamine-4,8-disulphonic acid | 4-butylphenol | Do. |
| 51 | 1-β-aminoethyl-4-methyl-6-hydroxypyrid-2-one | do | do | Greenish-yellow. |
| 52 | do | 2-naphthylamine-1,5-disulphonic acid | do | Do. |
| 53 | do | do | 4-nonylphenol | Do. |
| 54 | do | do | 4-butylaniline | Do. |
| 55 | do | Aniline-2,5-disulphonic acid | 4-nonylphenol | Do. |
| 56 | 1-β-aminoethyl-3,4-dimethyl-6-hydroxypyrid-2-one | do | do | Do. |
| 57 | do | 2-naphthylamine-1,5-disulphonic acid | do | Do. |
| 58 | do | do | 4-butylphenol | Do. |
| 59 | do | 2-naphthylamine-4,8-disulphonic acid | do | Do. |
| 60 | 1-β-aminoethyl-3-cyano-4-methyl-6-hydroxypyrid-2-one | Aniline-2,5-disulphonic acid | 4-nonylphenol | Yellow. |
| 61 | do | 2-naphthylamine-1,5-disulphonic acid | 4-butylaniline | Reddish-yellow. |
| 62 | 1-(3-aminophenyl)-3-cyano-4-methyl-6-hydroxy-2-one | Aniline-2,5-disulphonic acid | 4-butylphenol | Greenish-yellow. |

What we claim is:

1. A water-soluble monoazo dyestuff of the formula

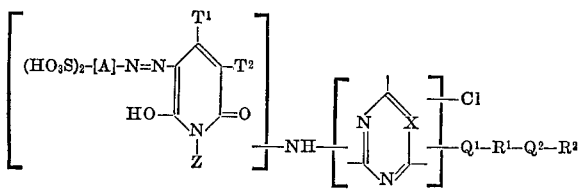

wherein A represents benzene or naphthalene; Z represents hydrogen, lower alkyl, hydroxyethyl, cyclohexyl or phenyl; $T^1$ represents hydrogen, hydroxyl or lower alkyl; $T^2$ represents hydrogen, lower alkyl, carbamoyl or cyano; Z represents lower alkyl or phenyl; the —NH— group is directly attached to A or to Z; X represents =N—,

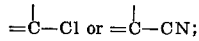

$Q^1$ represents oxygen, sulphur or —NH—; $Q^2$ represents oxygen or a direct bond; $R^1$ represents ethylene, phenylene or cyclohexylene; and $R^2$ represents alkyl having 2–15 carbon atoms, benzyl, phenyl or cyclohexyl, such that $R^1$ and $R^2$ together contain at least 8 carbon atoms.

2. The water-soluble monoazo dyestuff of claim 1 of the formula

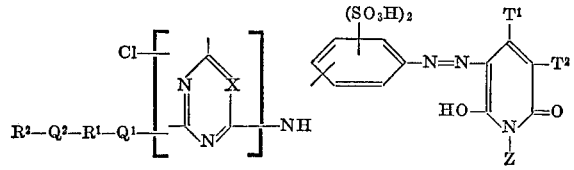

wherein $T^1$, $T^2$, Z, $Q^1$, $Q^2$, $R^1$ and $R^2$ have the meaning given in claim 1.

3. The water-soluble monoazo dyestuff of claim 1 of the formula

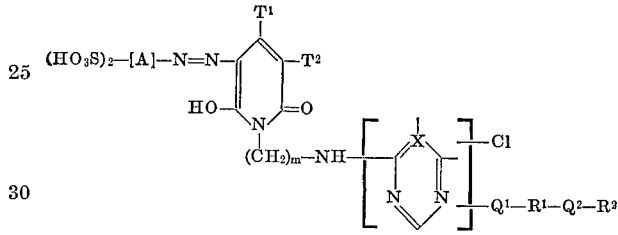

wherein $T^1$, $T^2$, $R^1$, $R^2$, $Q^1$, $Q^2$, X and A have the meaning given in claim 1 and $m$ is an integer of 2–6.

References Cited

UNITED STATES PATENTS

| 3,658,783 | 4/1972 | Knobloch et al. | 260—153 |
| 3,455,897 | 7/1969 | Barben | 260—146 |
| 3,709,869 | 1/1973 | Mazza | 260—153 |

OTHER REFERENCES

Wagner et al., *Synthetic Organic Chemistry*, John Wiley & Sons, Inc., New York, 1953, pp. 226–228 and 787–788.

LORRAINE A. WEINBERGER, Primary Examiner

C. F. WARREN, Assistant Examiner

U.S. Cl. X.R.

260—154, 156, 249.5